United States Patent
Shima et al.

(10) Patent No.: US 6,264,126 B1
(45) Date of Patent: Jul. 24, 2001

(54) TAPE CARTRIDGE

(75) Inventors: Motohiko Shima; Hiroshi Kaneda, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/625,146

(22) Filed: Jul. 25, 2000

(30) Foreign Application Priority Data

Jul. 26, 1999 (JP) .................................................. 11-210351

(51) Int. Cl.$^7$ .................................................. G03B 23/02
(52) U.S. Cl. .......................................... 242/343; 360/132
(58) Field of Search ................................ 242/343, 343.1, 242/343.2, 338, 338.1, 338.2, 348, 348.1, 348.3; 360/132, 134

(56) References Cited

U.S. PATENT DOCUMENTS

| | | | |
|---|---|---|---|
| 5,027,249 | * 6/1991 | Johnson et al. | 360/132 |
| 5,813,622 | * 9/1998 | Von Alten | 242/343 X |
| 5,826,811 | * 10/1998 | Melbye et al. | 242/343 X |
| 5,893,527 | * 4/1999 | Mizutani et al. | 242/343.2 X |
| 5,901,916 | * 5/1999 | McAllister et al. | 242/343 X |
| 6,014,293 | * 1/2000 | Casey et al. | 360/132 |
| 6,097,574 | * 8/2000 | Morita et al. | 360/132 |

FOREIGN PATENT DOCUMENTS

| | | |
|---|---|---|
| 0 284 687 | 10/1988 | (EP) . |
| 63-251983 | 10/1988 | (JP) . |

* cited by examiner

*Primary Examiner*—William A. Rivera
(74) *Attorney, Agent, or Firm*—Marshall, O'Toole, Gerstein, Murray & Borun

(57) ABSTRACT

A tape cartridge having a housing formed of upper and lower casings, a single tape reel around which a length of tape is wound and which is turnably held within the housing, the lower casing having an opening through which a drive shaft of a recorder is to be inserted, the tape reel having an upper flange, a lower flange, and a hub which is open at top and closed at bottom, the hub having a hole formed at its bottom in engagement with a brake release plate, a metal disk disposed on the outer side of the bottom of the hub, teeth formed on the bottom around the disk for engagement with the drive shaft of a recorder, the hub having teeth provided on the inner side of its bottom in mesh with a brake lock, a brake release plate mounted in the hub in engagement with its hole, a brake lock mounted further on the brake release plate, the brake lock having brake teeth on the outer periphery of its bottom and follower projections on its top, the hub teeth and the brake teeth of the brake lock being engageable to prevent turning of the tape reel, the follower projections being adapted to be guided by a guide provided in the upper casing, and a spring member disposed between the brake lock and upper casing to urge the brake lock normally in the braking position. The guide of the upper casing and the follower of the brake lock having contours such that the former has guide slopes and positioning points and the latter has projections adapted to be guided by the guide slopes and positioned at the positioning points so that the latter revolves in sliding contact with and fits in the former for positioning.

3 Claims, 6 Drawing Sheets

TAPE CARTRIDGE

BACKGROUND OF THE INVENTION

1. Field of the Invention

This invention relates to a single-reel type tape cartridge for magnetic recording-reproducing apparatus.

2. Prior Art

Japanese Patent Application Kokai No. 63-251983 discloses a single-reel type tape cartridge in which a brake lock is urged downward by a spring member to keep teeth formed on the brake lock in mesh with teeth of the reel so as to avoid unwanted turning of the reel when the tape cartridge is not in use. When the cartridge is loaded in recording-reproducing apparatus (hereinafter called a "recorder"), a projection of the brake lock is raised by a drive of the recorder to a predetermined position where the teeth of the reel and the brake lock are out of mesh to set the reel free to turn and allow the tape to be drawn out. The brake lock is formed with a cruciform recess adapted to engage with a cruciform projection in the upper casing of the housing, whereby the brake lock is made movable upward and downward without turning.

FIG. 4 is an exploded view of a single-reel type cartridge of the prior art, and FIG. 5 is a cross sectional view of the essential parts of the cartridge. For a better understanding of the arrangement the components are shown upside down. The cartridge comprises a housing composed of an upper casing 1 and a lower casing 2, and a single tape reel 3 around which a length of tape 14 is wound and which is turnably held within the housing.

Between upper and lower casings 1, 2 is formed an opening composed of half openings 12, 22 in the both casings and which is adapted to receive a leader block 18 as the latter is drawn out by a drive member of a recorder.

Tape reel 3 has a hub 32 formed in one piece with a lower flange 33. Tape reel 3 is driven for rotation by a drive of a recorder through the opening 22 of lower casing 2.

On the inner surface of hub 32 is provided teeth adapted to engage with a brake lock 5 to prevent unwanted turning of tape reel 3 when the cartridge is not in use.

Brake lock 5 has teeth 51 on its underside which is in mesh with the teeth of hub 32. Brake lock 5 is normally urged in a braking position by a brake spring 4.

Follower projections 52 of brake lock 5 are formed with recesses 73 for sliding engagement with a guide member 13 formed on the inner surface of upper casing 1, so that brake lock 5 can be positively moved up and down between a lower braking position and an upper brake release position.

A brake-releasing projection 63, formed on the underside of brake lock 5, fits in a center hole 43 at the bottom of hub 32. As the cartridge is inserted in a recorder, brake-releasing projection 63 is forced upward, with concomitant upward movement of brake lock 5 out of engagement with tape reel 3, setting the reel free to turn.

The beginning of tape 14 is wound round a pin member 8, which in turn is fitted securely in a pin-receiving groove of leader block 18. When the cartridge is loaded in a recorder, a draw-out member of the recorder enters a clamp groove 19 of leader block 18 to grip the block, draw it out, thread the tape up to take-up reel along a tape path inside the recorder, and eventually hold the block in a recess formed on the outer periphery of the take-up reel in the recorder.

Not merely the counterpart of the tape cartridge of the prior art but generally the brake mechanism of the character in which a brake lock moves upward and downward as fitted in a projection of projections formed in the upper casing of a cartridge housing has a construction such that a guide member (indicated at 11 in FIGS. 1 and 2) of the upper casing and recesses of the brake lock are combined so as to avoid turning of the brake lock itself. Usually a tape cartridge is assembled by first packing the lower casing with upper casing. The assembling is impossible if the recesses of the brake lock and the projections of the upper casing are not properly aligned, and actually the aligning has involved much difficulty.

SUMMARY OF THE INVENTION

The present invention solves the problems of the prior art by providing a tape cartridge equipped with a brake mechanism of the character having a brake lock which moves upward and downward in engagement with projections formed in the upper casing of the cartridge housing, wherein a guide of the upper casing and a follower of the brake lock having contours such that the former has guide slopes and positioning points and the latter has projections adapted to be guided by the guide slopes and positioned at the positioning points so that the latter revolves in sliding contact with and fits in the former for positioning.

To be more concrete, the invention provides a tape cartridge comprising a housing composed of upper and lower casings, a single tape reel around which a length of tape is wound and which is turnably held within the housing, the lower casing having an opening through which a drive shaft of a recorder is to be inserted, the tape reel being composed of an upper flange, a lower flange, and a hub which is open at top and closed at bottom, the hub having a hole formed at its bottom in engagement with a brake release plate, a metal disk being attached to the outer side of the bottom of the hub and teeth being formed on the underside around the disk for engagement with the drive shaft of a recorder, the hub having teeth provided on the inner side of its bottom in mesh with a brake lock, a brake release plate mounted in the hub in engagement with its hole, a brake lock mounted further on the brake release plate, the brake lock having brake teeth on the outer periphery of its bottom and follower projections on its top, the hub teeth and the brake teeth of the brake lock being engageable to prevent turning of the tape reel, the follower projections being adapted to be guided by a guide provided in the upper casing, and a spring member disposed between the brake lock and upper casing to urge the brake lock normally in the brake position. The guide of the upper caseing and the follower of the brake lock have contours such that the former has guide slopes and positioning points and the latter has projections adapted to be guided by the guide slopes and positioned at the positioning points so that the latter revolves in sliding contact with and fits in the former positioning. Thus the brake lock at the time of assembling can be accurately positioned, regardless of its direction, with respect to the guiding part of the upper casing. This brings improvements in efficiency and quality of tape cartridge assembling.

Here each of the positioning points is formed of two walls defining a gap for sliding contact with each of the slopes, and each of the projections is adapted to fit in each of the gaps for positioning. The height of each wall is made greater than the distance that the brake lock travels, whereby the direction of travel of the brake lock is constrained to be vertical.

DESCRIPTION OF THE PREFERRED EMBODIMENT

The present invention will now be described in detail in connection with an embodiment thereof.

Figure 1:
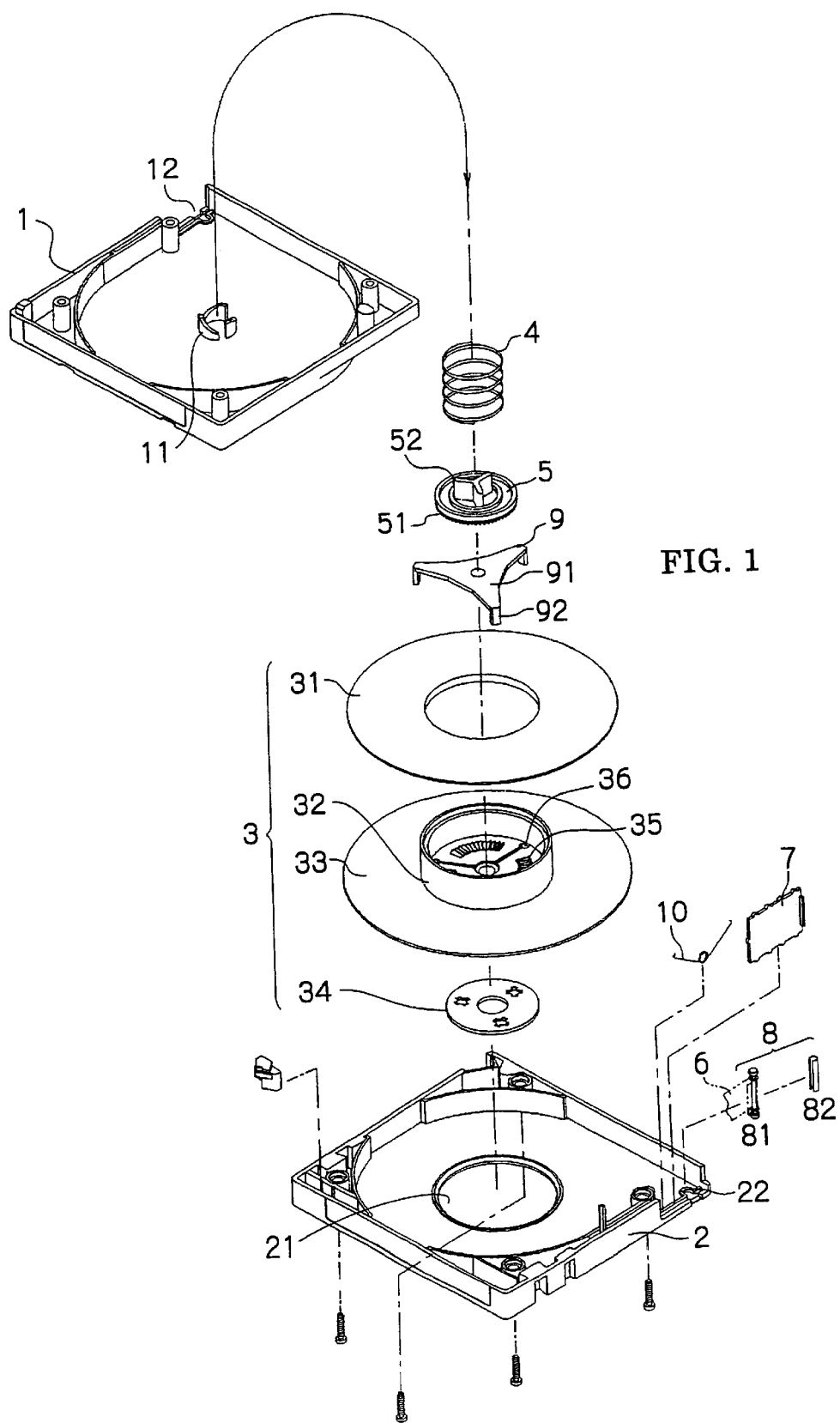
FIG. 1 is an exploded view of a tape cartridge embodying the present invention.

FIG. 1 is an exploded view of a tape cartridge embodying the invention.

Figure 1A:
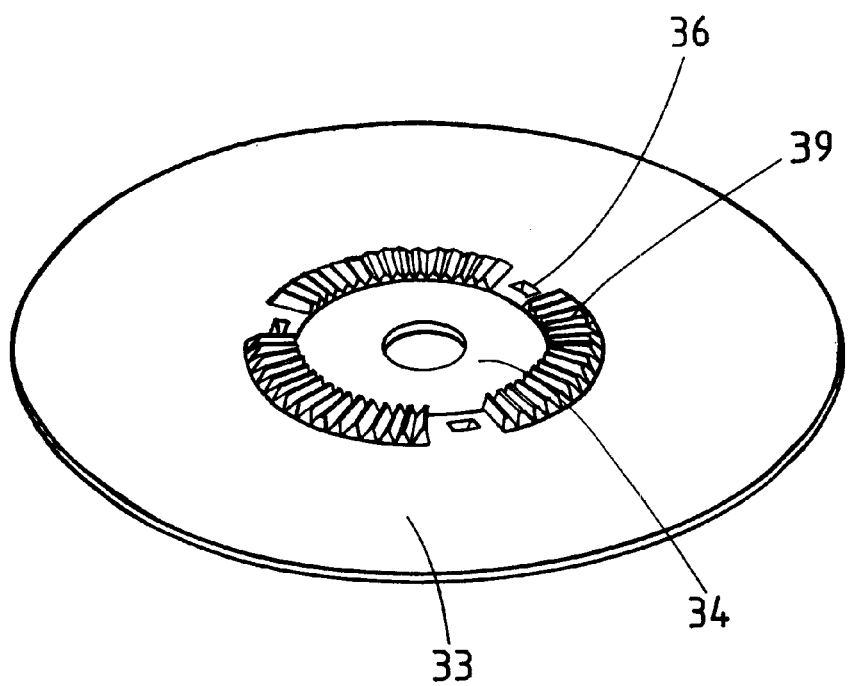
FIG. 1a is a perspective view of the underside of the lower flange of the tape cartridge of FIG. 1.

The cartridge turnably contains a single tape reel 3 on which a length of tape is wound in a housing consisting of an upper casing 1 and a lower casing 2. Lower casing 2 has an opening 21 into which a drive shaft of a recorder is to be inserted. Upper and lower casing 1, 2 are formed, respectively, with cutouts 12, 22 which are combined to form an opening through which the tape is to be drawn out. Tape reel 3 consists integrally of an upper flange 31, a hub 32 formed in one piece with a lower flange 33, and a metal disk 34 that fits to the underside of hub 32. Metal disk 34 is attached to the underside and has teeth 39 (shown in FIG. 1a) formed on the underside around its periphery and adapted to engage with a drive shaft of a recorder. Metal disk 34 is magnetically attracted by the drive shaft of a recorder to turn tape reel 3. There is no member to fix the tape in place, because the tape is directly affixed to the outer periphery of the hub with water or the like.

Hub 32 has a tooth-like part 35 formed on its inner surface to be in mesh with a brake lock 5 to prevent unwanted turning of tape reel 3 when the latter is not in use. Brake lock 5 has teeth 51 formed on its underside in mesh with teeth 35 of hub 32. Brake lock 5 is normally urged in the braking position by brake spring 4. A projection 52 of brake lock 5 is adapted to engage with a guide member 11 formed on the inner surface of upper casing 1, so that brake lock 5 can positively move upward and downward (to a braking position and a brake release position). Between hub 32 and brake lock 5 is interposed a brake release plate 9, which consists of a main plate 91 and legs 92. Legs 92 fit in holes 36 formed in the under surface of hub 32. As the cartridge is loaded in a recorder, the legs 92 of brake release plate 9 are forced upward by the recorder, accompanied with an upward movement of brake lock 5 out of engagement with tape reel 3, allowing the reel to turn freely. The beginning of tape is fixed to a leader 8, which is composed of a pin member 81 and a C-shaped clamp 82. The tape end is wound round pin member 81 and is secured in position as C-shaped claim 82 is fitted on them. When the cartridge is inserted into a recorder, leader 8 is held by a holder of the recorder so that tape 6 may be drawn out. The tape draw-out opening is opened or closed by a door member 7. Door member 7 is normally urged by a spring 10 in the direction where it closes the draw-out opening.

Figure 2:
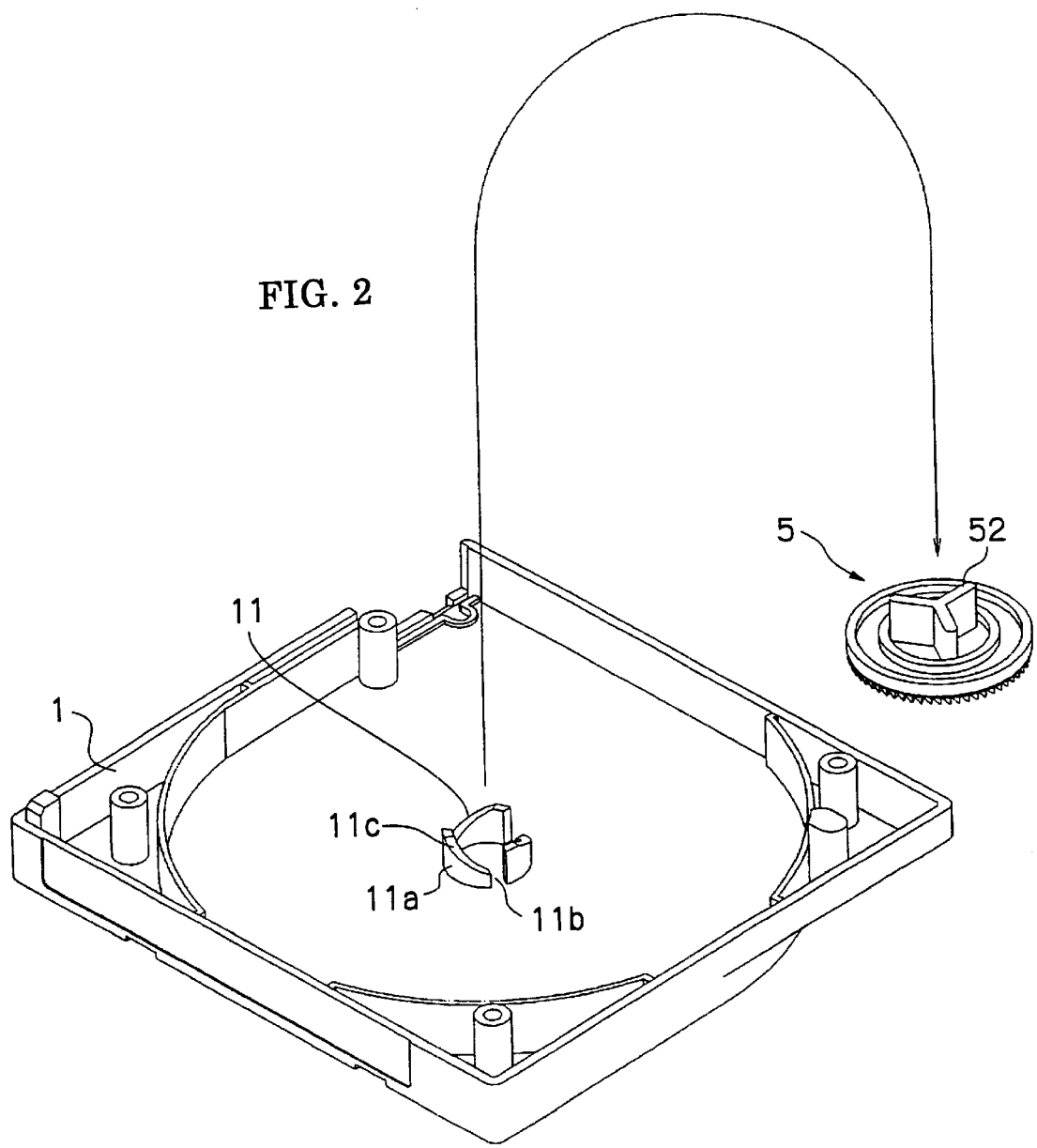
FIG. 2 is a perspective view of an upper casing and a brake lock.

FIG. 2 is a perspective view of upper casing 1 and brake lock 5. Projections 52 of brake lock 5 are in the form of three blades. Guide member 11 formed on the inner surface of upper casing 1 consists of three accurate walls 11a. Gaps 11b are formed between the walls 11a, one for each. Three projections 52 of brake lock 5 fit in these gaps. Each wall 11a is substantially vertical at both ends (the end faces that define the ends of adjoining gaps 11b) so as to position brake lock 5 securely against turning. Walls 11a have generally same slopes 11c on top. In this arrangement slopes 11c guide projections 52 into gaps 11b at the time of assembling, even if they are not initially aligned to gaps 11b but remain in contact with the tops of walls 11a. Usually when assembling a tape cartridge of this type, lower casing 2 is packed with components and then is covered with upper casing 1. Thereafter the temporary assembly is turned upside down and the two casings are fastened together with screws.

Figure 3:
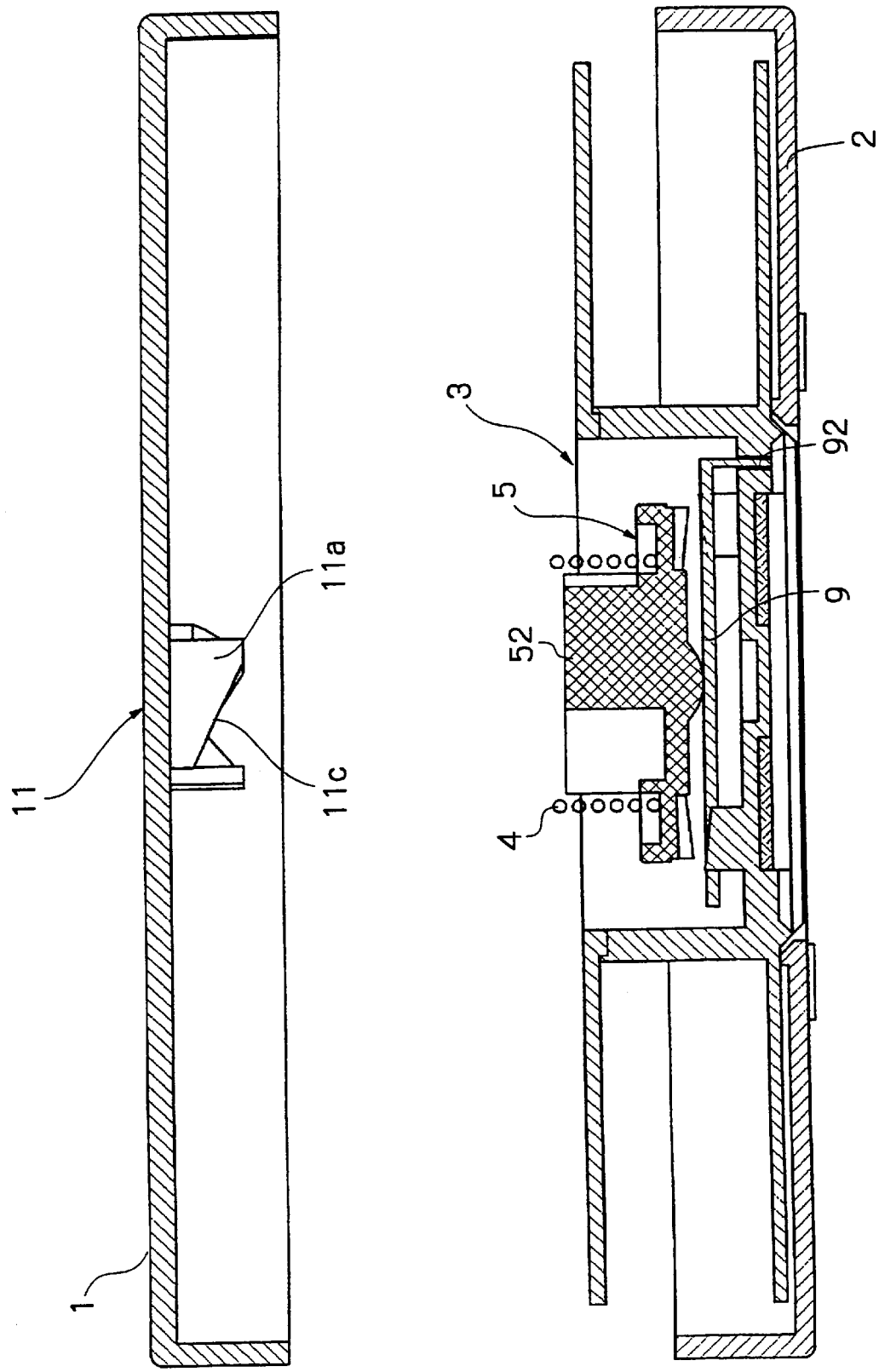
FIG. 3 is a cross sectional view of a cartridge before covering with an upper casing.
Figure 4:
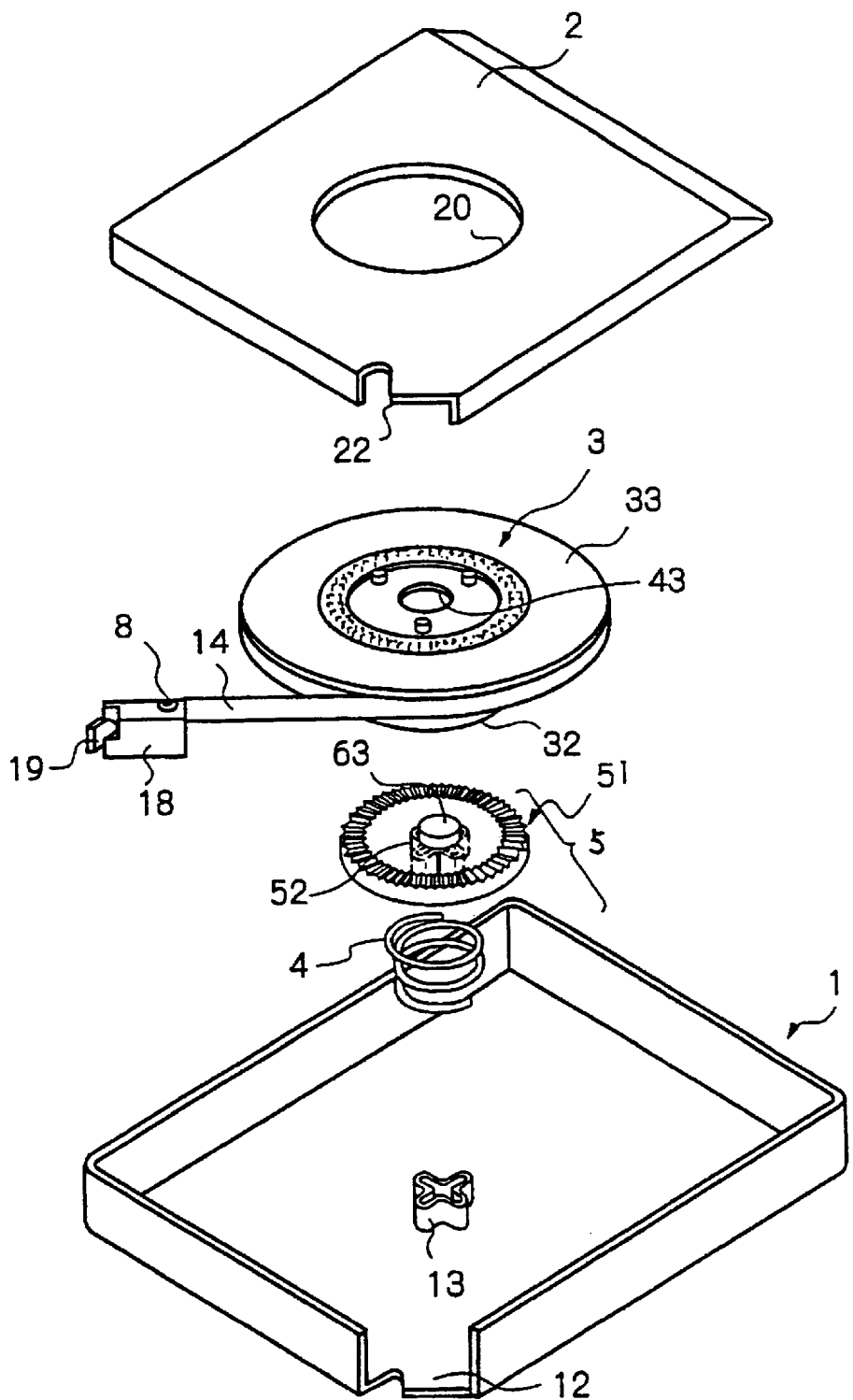
FIG. 4 is an exploded view of a cartridge of the prior art.
Figure 5:
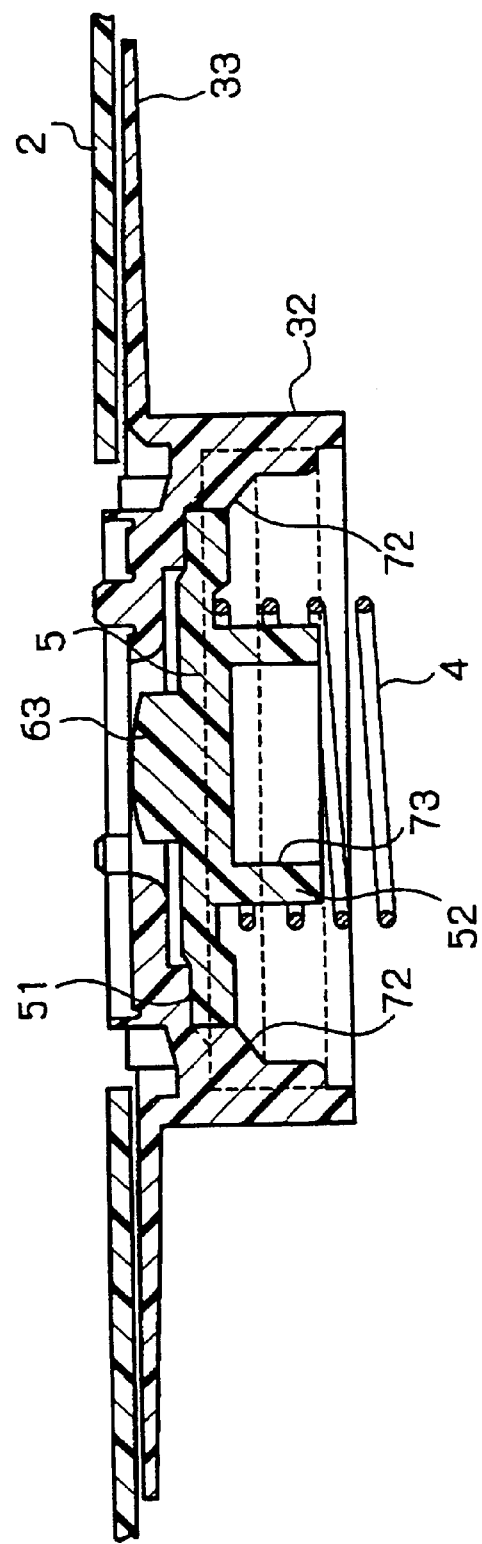
FIG. 5 is an enlarged cross sectional view of essential parts of the cartridge shown in FIG. 4.

FIG. 3 is a cross sectional view of the cartridge before the packed lower casing is covered with the upper casing. As upper casing 1 is placed on the lower casing and is pressed downward with a certain degree of force, even though gaps 11b and projections 52 are out of alignment, brake lock 5 is turned and positioned as desired. If the housing is in an ordinarily packed state where teeth 35 of hub 32 are in mesh with teeth 51 of brake lock 5, brake lock 5 would turn together with tape reel 3. In that case, positioning would call for a considerable amount of force. Then brake lock 5 and hub 32 are preferably put out of engagement prior to assembling, by pressing the legs 92 of brake release plate 9 against the stage where the tape cartridge is placed, because it allows brake lock 5 alone to turn, facilitating the assembling work.

In the state where the cartridge is assembled as above, it is desirable to set the height of the lower end of each slope 11c slightly greater than the stroke in the vertical direction of brake lock 5, lest projections 52 of brake lock should deviate from gaps 11b of guide member 11.

While an embodiment of the invention has thus far been described as having three projections 52, the number of projections is not limited thereto. It is also possible to reverse the relationship between the projections and guiding part (by forming a guide on the brake lock and forming projections on the inner surface of the upper casing).

According to the present invention, as explained above, brake lock at the time of assembling can be accurately positioned, regardless of its direction, with respect to the guiding part of the upper casing. This brings improvements in efficiency and quality of tape cartridge assembling.

What is claimed is:

1. A tape cartridge comprising a housing composed of upper and lower casings, a single tape reel around which a length of tape is wound and which is turnably held within the housing, said lower casing having an opening through which a drive shaft of a recorder is to be inserted, said tape reel being composed of an upper flange, a lower flange, and a hub which is open at top and closed at bottom, said hub having a hole formed at the bottom thereof in engagement with a brake release plate, a metal disk disposed on the outer side of the bottom of said hub, and teeth formed on the bottom around the disk for engagement with the drive shaft of a recorder, said hub having teeth provided on the inner side of the bottom thereof in mesh with a brake lock, a brake release plate mounted in said hub in engagement with the hole of said hub, a brake lock mounted further on said brake release plate, said brake lock having brake teeth on the outer periphery of the bottom thereof and follower projections on the top thereof, said hub teeth and said brake teeth of the brake lock being engageable to prevent turning of said tape reel, said follower projections being adapted to be guided by a guide provided in said upper casing, and a spring member disposed between said brake lock and upper casing to urge said brake lock normally in the braking position, characterized in that said guide of said upper casing and said follower of said brake lock having contours such that the former has guide slopes and positioning points and the latter has projections adapted to be guided by said guide slopes and positioned at said positioning points so that the latter revolves in sliding contact with and fits in the former for positioning.

2. The tape cartridge of claim 1, wherein each of said positioning points is formed of two walls defining a gap for sliding contact with each said slope, and each said projection is adapted to fit in each said gap for positioning.

3. The tape cartridge of claim 2, wherein the height of each said wall is greater than the distance said brake lock travels.

* * * * *